(12) United States Patent
Nguyen et al.

(10) Patent No.: US 6,257,335 B1
(45) Date of Patent: Jul. 10, 2001

(54) STIMULATING FLUID PRODUCTION FROM UNCONSOLIDATED FORMATIONS

(75) Inventors: Philip D. Nguyen; Jimmie D. Weaver; John L. Brumley, all of Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 09/518,159

(22) Filed: Mar. 2, 2000

(51) Int. Cl.$^7$ ................... E21B 33/138; E21B 43/267
(52) U.S. Cl. ................ 166/280; 166/281; 166/295; 507/924
(58) Field of Search .................. 166/280, 281, 166/295, 300; 507/924; 523/130

(56) References Cited

U.S. PATENT DOCUMENTS

| | | | |
|---|---|---|---|
| 2,805,721 | * 9/1957 | Maly | 166/281 |
| 3,070,160 | * 12/1962 | Reistle, Jr. | 166/281 |
| 3,525,398 | 8/1970 | Fisher | 166/288 |
| 3,608,639 | 9/1971 | Hart | 166/308 |
| 3,815,680 | 6/1974 | McGuire et al. | 166/281 |
| 3,830,299 | * 8/1974 | Thomeer | 166/281 |
| 3,854,533 | * 12/1974 | Gurley et al. | 166/281 X |
| 4,649,998 | 3/1987 | Friedman | 166/294 |
| 4,787,449 | * 11/1988 | Jones | 166/281 X |
| 4,917,188 | 4/1990 | Fitzpatrick, Jr. | 166/295 |
| 5,058,676 | 10/1991 | Fitzpatrick et al. | 166/278 |
| 5,273,115 | * 12/1993 | Spafford | 166/281 |
| 5,372,195 | * 12/1994 | Swanson et al. | 166/281 X |
| 5,492,178 | 2/1996 | Nguyen et al. | 166/276 |
| 5,609,207 | * 3/1997 | Dewprashad et al. | 166/280 X |
| 5,791,415 | 8/1998 | Nguyen et al. | 166/280 |
| 5,913,364 | * 6/1999 | Sweatman | 166/281 |
| 5,960,880 | * 10/1999 | Nguyen et al. | 166/280 |
| 6,016,870 | * 1/2000 | Dewprashad et al. | 166/295 |
| 6,047,773 | * 4/2000 | Zeltmann et al. | 166/281 |

OTHER PUBLICATIONS

L. R. Norman et al., "Application Of Curable Resin–Coated Proppants," *SPE Production Engineering* (Nov. 1992), 343–49.

* cited by examiner

*Primary Examiner*—George Suchfield
(74) *Attorney, Agent, or Firm*—Robert A. Kent; C. Clark Dougherty, Jr.

(57) ABSTRACT

The present invention provides methods of stimulating fluid production from an unconsolidated formation penetrated by a wellbore while preventing the migration of formation sand with fluids produced from the formation. The methods basically comprise the steps of injecting a liquid composition into a portion of the formation surrounding the wellbore which converts into a gel-like substance and plugs the permeability of the injected portion of the formation, but allows the injected portion to remain flexible and resist breakdown due to pressure cycling therein, creating at least one fracture in the formation extending from the wellbore through the plugged portion of the formation into an unplugged portion thereof and depositing hardenable resin composition coated proppant in the fracture and causing the resin composition to harden and consolidate the proppant into a hard permeable mass.

31 Claims, No Drawings

STIMULATING FLUID PRODUCTION FROM UNCONSOLIDATED FORMATIONS

BACKGROUND OF THE INVENTION

1. Field of the Invention

The present invention relates generally to improved methods of stimulating wells in unconsolidated or poorly consolidated formations, and more particularly, to methods of stimulating hydrocarbon fluid production from such wells while preventing the migration of sand with the fluids produced therefrom.

2. Description of the Prior Art

Oil and gas wells are often completed in unconsolidated formations containing loose and incompetent or poorly consolidated sand which migrates with oil, gas and/or water produced by the wells. The presence of sand in the produced fluids is disadvantageous and undesirable in that the sand particles abrade pumping and other producing equipment and reduce the fluid production capabilities of the produced zones in the wells.

Incompetent subterranean formations include those which contain loose sand that is readily entrained by produced fluids and those wherein the sand particles making up the formations are bonded together with insufficient bond strength to withstand the forces produced by the product of fluids from the formations. A technique which is often used for minimizing sand production from such formations has been to produce fluids from the formations at low flow rates whereby the near well stability of sand bridges and the like in the formations are preserved. However, the collapse of such sand bridges often occurs as a result of unintentional high production rates and/or pressure cycling. Pressure cycling occurs from frequent shut-ins and start ups of a well. The frequency of pressure cycling is very critical to the longevity of the near well formation, especially during the depletion stage of the well when the pore pressure of the formation has already been significantly reduced.

Heretofore, weakly consolidated formations have been treated by creating fractures in the formations and depositing proppant in the fractures to maintain them in open positions. In addition, the proppant has heretofore been consolidated within the fractures into hard permeable masses by hardenable resin compositions to reduce the migration of sand through the fractures with produced fluids. Very often, to insure that sand is not produced, costly gravel packs, sand screens and the like have been installed in the wells. Since gravel packs and sand screens filter out sand from the fluids being produced, the presence of the filtered sand adds to the flow resistance thereby producing additional pressure draw down which causes the fracture faces and other portions of the unconsolidated formations to break down and the consolidated proppant in fractures, gravel packs and the like to be bypassed.

Thus, there is a need for improved methods of stimulating fluid production from unconsolidated permeable formations penetrated by wellbores while preventing the migration of formation sand with fluids produced therefrom.

SUMMARY OF THE INVENTION

The present invention provides improved methods of stimulating fluid production from unconsolidated or weakly consolidated permeable producing formations penetrated by wellbores while preventing the migration of formation sand with fluids produced therefrom. The methods of this invention basically comprise the steps of (a) injecting a liquid composition into a portion of the permeable producing formation surrounding the wellbore which subsequently converts into a gel-like substance and plugs the permeability of the injected portion of the formation, but allows the injected portion to remain flexible and to resist breakdown due to pressure cycling therein; (b) creating at least one fracture in the formation extending from the wellbore through the portion of the formation plugged in accordance with step (a) into an unplugged portion thereof; and (c) depositing hardenable resin composition coated proppant in the fracture and causing the resin composition to harden whereby the proppant is consolidated into a hard permeable mass which filters out and prevents the migration of formation sand with fluids produced through the fracture into the wellbore.

The liquid composition utilized in step (a) to plug the permeability of a portion of the formation can be any of several liquid compositions that cure or convert into a gel-like substance and plug the permeability of the formation. Examples of such liquid compositions include, but are not limited to, organic resin compositions, aqueous sodium silicate compositions and water soluble polymerizable monomer compositions.

The combination of the flexible plugged portion of the formation surrounding the wellbore through which at least one fracture extends and the consolidated permeable proppant in the fracture prevents the migration of sand with produced fluids from the formation.

It is, therefore, a general object of the present invention to provide improved methods of stimulating fluid production from unconsolidated or poorly consolidated permeable producing formations penetrated by wellbores while preventing the migration of formation sand with fluids produced therefrom.

Other and further objects, features and advantages of the present invention will be readily apparent to those skilled in the art upon a reading of the description of preferred embodiments which follows.

DESCRIPTION OF PREFERRED EMBODIMENTS

The present invention provides improved methods of stimulating fluid production from unconsolidated or poorly consolidated permeable producing formations penetrated by wellbores while preventing the migration of formation sand with fluids produced from the formations. The methods eliminate the necessity of installing expensive gravel packs, sand screens and the like in the wellbores.

The methods of this invention are basically comprised of the steps of (a) injecting a liquid composition into a portion of the formation surrounding a wellbore which subsequently converts into a gel-like substance and plugs the permeability of the injected portion of the formation, but allows the injected portion to remain flexible and to resist breakdown due to pressure cycling therein; (b) creating at least one fracture in the formation extending from the wellbore through the portion of the formation plugged in accordance with step (a) into an unplugged portion thereof; and (c) depositing hardenable resin composition coated proppant in the fracture and causing the resin composition to harden whereby the proppant is consolidated into a hard permeable mass which filters out and prevents the migration of formation sand with fluids produced through the fracture into the wellbore.

Examples of liquid compositions that can be caused to subsequently convert into a gel-like substance which plugs the permeability of a formation, but allows the formation to remain flexible include, but are not limited to, curable organic resin compositions, gellable aqueous silicate compositions and polymerizable organic monomer compositions.

Curable organic resin compositions are well known to those skilled in the art as are their uses for consolidating portions of unconsolidated formations and fracture proppant materials into hard permeable masses. While the organic resin compositions utilized in accordance with the present invention can be similar to those heretofore used to consolidate sand and proppant into hard permeable masses, they function in accordance with the present invention to form flexible gel-like substances which plug the permeability of portions of unconsolidated formations. That is, the curable organic resin compositions are used in accordance with this invention to form resilient gel-like substances in the pore spaces of a portion of an unconsolidated or poorly consolidated formation and thereby allow that portion of the formation to remain flexible and to resist breakdown. It is not necessary or desirable for the cured organic resin composition to solidify and harden to provide high consolidation strength to the treated portion of the formation. On the contrary, upon being cured, the organic resin compositions useful in accordance with this invention form semi-solid, immovable, gel-like materials which stabilize the treated portion of the formation to allow it to absorb the stresses created during pressure cycling and thereby prevent breakdown of the formation which produces loose sand.

The curable organic resin compositions useful in accordance with this invention are basically comprised of a curable organic resin, a diluent and a delayed resin curing agent. When certain resin curing agents such as polyamides are utilized in the liquid organic resin compositions, the compositions cure into the semi-solid, immovable, gel-like materials described above. When other curing agents are used which would normally cause the organic resin compositions to harden into hard and brittle materials, one or more additives which provide flexibility to the cured compositions can also be included therein. Such additives are referred to hereinafter as "flexibilizer additives."

Examples of curable organic resins which can be utilized in accordance with this invention include polyepoxide resins, polyester resins, urea-aldehyde resins, furan resins and urethane resins. Of these, polyepoxide resins are preferred. A variety of reactive diluents can be utilized with the above curable organic resins including, but not limited to, phenols, formaldehydes, furfuryl alcohol, furfural, esters, alcohols and ethers such as butyl glycidyl ether, cresyl glycidyl ether and phenyl glycidyl ether. The diluent functions to reduce the viscosity of the organic resin to in the range of from about 3 to about 3,000 centipoises at 80° F. and is generally included in the organic resin composition in an amount in the range of from about 5% to about 75% by weight of organic resin utilized. The diluent also provides high flexibility to the final product.

When a flexibilizer additive is not included in the organic resin composition, the resin curing agent in the composition is preferably selected from the group consisting of amides and polyamides. The use of an amide curing agent causes the liquid organic resin composition to convert into a semi-solid, immovable, gel-like substance. When a flexibilizer additive is utilized, the curing agent can be one or more of amines, polyamines and other known resin curing agents.

The curing agent, with or without a flexibilizer additive, is generally included in the liquid organic resin composition in an amount in the range of from about 5% to about 75% by weight of organic resin therein, more preferably of from about 20% to about 60%.

When a flexibilizer additive is included in the liquid organic resin composition, it can be one or more of organic esters, oxygenated organic solvents and aromatic solvents, with organic esters such as dibutyl phthalate being the most preferred. When used, the flexibilizer additive is generally included in the liquid organic resin composition in an amount in the range of from about 5% to about 80% by weight of organic resin therein, more preferably from about 20% to about 45%.

The gellable aqueous silicate compositions which are useful in accordance with the present invention are basically comprised of an aqueous alkali metal silicate solution and a temperature activated catalyst for gelling the aqueous alkali metal silicate solution. The aqueous alkali metal silicate solution can include one or more of sodium, potassium, lithium, rubidium or cesium silicate. Sodium silicate is the most preferred silicate compound, and of the many forms in which sodium silicate exists, those having an $Na_2O$ to $SiO_2$ weight ratio in the range of from about 1:2 to about 1:4 are preferred. A specifically preferred aqueous sodium silicate solution has an $Na_2O$ to $SiO_2$ weight ratio of about 1:3.22.

The temperature activated catalysts which can be used include, but are not limited to, ammonium sulfate which catalyzes the alkali metal silicate solution and forms a gel at a temperature in the range of from about 60° F. to about 240° F.; sodium acid pyrophosphate which catalyzes the aqueous alkali metal silicate solution to form a gel at a temperature in the range of from about 60° F. to about 240° F.; citric acid which catalyzes the aqueous alkali metal silicate solution at a temperature in the range of from about 60° F. to about 120° F.; and ethylacetate which catalyzes the aqueous alkali metal silicate solution at a temperature in the range of from about 60° F. to about 120° F.

The polymerizable organic monomer compositions which are useful in accordance with this invention are basically comprised of water, a water soluble polymerizable organic monomer, an oxygen scavenger and a polymerization initiator. The water used to form the polymerizable monomer compositions can be from any source provided it does not contain an excess of compounds that adversely affect other components in the compositions. For example, the water can be fresh water, seawater, brine or water containing various concentrations of one or more salts.

A variety of water soluble polymerizable organic monomers can be utilized in the polymerizable compositions. Examples of such monomers include, but are not limited to, acrylic acid, methacrylic acid, acrylamide, methacrylamide, 2-methacrylamido-2-methylpropane sulfonic acid, 2-dimethylacrylamide, vinyl sulfonic acid, N,N-dimethylaminoethylmethacrylate, 2-triethylammoniumethylmethacrylate chloride, N,N-dimethylaminopropylmethacryl-amide, methacrylamidopropyltriethylammonium chloride, N-vinyl pyrrolidone, vinylphosphonic acid and methacryloyloxyethyl trimethylammonium sulfate and mixtures thereof.

More preferred polymerizable monomers which are self crosslinking include hydroxyethylacrylate, hydroxymethylacrylate, hydroxyethylmethacrylate, N-hydroxymethylacrylamide, N-hydroxymethylmethacrylamide, polyethylene glycol acrylate, polyethylene glycol methacrylate, polypropylene glycol acrylate, polypropylene glycol methacrylate and mixtures thereof. Of these, hydroxyethylacrylate is most preferred. A particularly preferred polymerizable monomer is hydroxyethylcellulose-vinyl phosphoric acid.

The water soluble polymerizable monomer or monomers used are combined with the water in a general amount in the range of from about 5% to about 30% by weight of the water. More preferably, the monomer or monomers are present in the water in an amount in the range of from about 10% to about 20% by weight of the water.

The presence of oxygen in the polymeric composition inhibits the polymerization process. Therefore, an oxygen scavenger is included in the composition. A preferred such oxygen scavenger is stannous chloride which is generally dissolved in a 0.5% by weight aqueous hydrochloric acid solution in an amount of about 10% by weight of the solution. The resulting stannous chloride-hydrochloric acid solution is combined with the polymerizable composition in an amount in the range of from about 5% to about 10% by weight of the composition.

A variety of polymerization initiators can be utilized n accordance with this invention, i.e., the polymerization initiator can be any suitable water soluble compound or compounds which form free radicals in aqueous solutions. Such compounds include, but are not limited to, alkali metal persulfates, peroxides, oxidation-reduction systems employing reducing agents such as sulfites in combination with oxidizers and azo polymerization initiators.

Azo polymerization initiators are preferred for use herein in that they can have activation temperatures ranging from about 40° F. to about 200° F. By determining the temperature of the formation into which the polymerizable monomer composition is to be placed, an azo compound can be selected for polymerization initiation which has an activation temperature equal to or slightly less than the temperature of the formation.

The preferred azo compounds for use herein are 2,2'-azobis(2-imidazole-2-hydroxyethyl) propane which has an activation temperature in the range of from about 70° F. to about 100° F., 2,2'-azobis(2-aminopropane) which has an activation temperature in the range of from about 100° F. to about 140° F., 4,4'azobis(4-cyanovaleric acid) which has an activation temperature of from about 130° F. to about 150° F. and 2,2'-azobis(2-methyl-N-(2-hydroxyethyl) propionamide which has an activation temperature of from about 150° F. to about 200° F. The quantity of the azo initiator employed is generally from about 0.1% to about 5% by weight of polymerizable monomer in the composition.

When the subterranean location in which the polymerizable monomer composition is placed is relatively cool as compared to the surface mixing temperature, e.g., below the mud line in offshore well operations, a secondary initiator such as triethanolamine can be included in the composition. The secondary initiator reacts with the primary initiator to provide free radicals at a lower temperature. Polysaccharide cross-linking delaying agents derived from guar, guar derivatives, and cellulose derivatives can also be included in the composition to delay cross-linking by cross-linking agents in the composition such as borates, titanium, zirconium, aluminum, antimony ions, or metal oxides such as magnesium oxide.

As stated above, after a portion of the permeable formation surrounding the wellbore is plugged in accordance with step (a), step (b) is carried out whereby at least one fracture is created in the formation extending through the plugged portion of the formation into an unplugged portion thereof. The fracture or fractures are created by pumping a viscous fracturing fluid containing suspended hardenable resin composition coated proppant into the formation at a rate and pressure whereby fractures are created therein. The continued pumping of the fracturing fluid extends the fractures in the formation and carries the resin composition coated proppant into the fracture or fractures formed. Upon the reduction of the flow of the fracturing fluid and the reduction in pressure exerted on the formation, the proppant is deposited in the fracture or fractures and the fracture or fractures are prevented from closing by the presence of the proppant therein.

Typical fracturing fluids which have been utilized heretofore include gelled water, oil base liquids, foams and emulsions. The most common fracturing fluid which has been utilized heretofore is comprised of an aqueous liquid such as fresh water or salt water combined with a gelling agent for increasing the viscosity of the fluid. The increased viscosity reduces fluid loss and allows the fracturing fluid to transport significant concentrations of proppant into the created fractures.

A variety of gelling agents have been utilized including hydratible polymers which contain one or more of functional groups such as hydroxyl, cis-hydroxyl, carboxyl, sulfate, sulfonate, amino or amide. Particularly useful such polymers are polysaccharides and derivatives thereof which contain one or more of the monosaccharide units galactose, mannose, glucoside, glucose, xylose, arabinose, fructose, glucuronic acid or pyranosyl sulfate. Natural hydratible polymers including the foregoing functional groups and units include guar gum and derivatives thereof, locust bean gum, tara, konjak, tamarind, starch, cellulose and derivatives thereof, karaya, xanthan, tragacanth and carrageenan. Hydratible synthetic polymers and copolymers which contain the above mentioned functional groups and which have been utilized heretofore include polyacrylate, polymethacrylate, polyacrylamide, maleic anhydride, methylvinyl ether polymers, polyvinyl alcohol and polyvinylpyrrolidone.

Preferred hydratible polymers which yield high viscosities upon hydration, i.e., apparent viscosities in the range of from about 10 centipoises to about 90 centipoises at concentrations in the range of from about 10 pounds per 1,000 gallons to about 80 pounds per 1,000 gallons in water are guar gum and guar derivatives such as hydroxypropylguar and carboxymethylguar, cellulose derivatives such as hydroxyethyl cellulose, carboxymethyl cellulose and carboxymethylhydroxyethyl cellulose, locust bean gum, carrageenan gum and xanthan gum.

The viscosities of aqueous polymer solutions of the types described above can be increased by combining crosslinking agents with the polymer solutions. Examples of crosslinking agents which can be utilized are multivalent metal salts or compounds which are capable of releasing the metal ions in an aqueous solution. Examples of such multivalent metal ions are chromium, zirconium, antimony, titanium, iron (ferrous or ferric), zinc, aluminum and borates.

The above described gelled or gelled and cross-linked fracturing fluids can also include gel breakers of the enzyme type, the oxidizing type or the acid buffer type which are well known to those skilled in the art. The gel breakers cause the viscous fracturing fluids to revert to thin fluids that can be produced back to the surface after they have been used to create fractures, carry proppant and deposit the proppant in one or more fractures formed in subterranean formations.

As mentioned, the proppant deposited in one or more fractures formed in a subterranean formation functions to prevent the fractures from closing due to overburden pressures, i.e., to prop the fractures open, whereby produced fluids can flow through the fractures. Also, the proppant is of a size such that formation sand migrating with produced fluids is prevented from flowing through the flow channels formed by the fractures, i.e., the proppant filters out the migrating sand. Various kinds of particulate materials can be utilized as proppant in accordance with the present invention including sand, bauxite, ceramic materials, glass materials and "TEFLON™" materials. The particulate material used can have a particle size in the range of from about 2 to about 400 mesh, U.S. Sieve Series. The preferred particulate material is graded sand having a particle size in the range of from about 10 to about 70 mesh, U.S. Sieve Series. Preferred sand particle size distribution ranges are 1 or more of 10–20 mesh, 20–40 mesh, 40–60 mesh or 50–70 mesh, depending on the particle size and distribution of the formation sand to be screened out by the proppant.

The proppant size and distribution are carefully selected in accordance with the size and distribution of the formation sand and the proppant is coated with a hardenable resin composition. The hardenable resin composition is preferably comprised of a hardenable organic resin and an aminosilane coupling agent such as N-β-(aminoethyl)-δ-aminopropyltrimethoxysilane. As is well known by those skilled in the art, the hardenable resin composition can be caused to harden after being introduced into the fracture or fractures formed and being heated by the formation. The resin composition can also be caused to harden by including a delayed internal hardening agent in the resin composition which causes the resin composition to harden after being deposited in the formation. The internal hardening agent can be one or more of the resin curing agents mentioned above. The most preferred such hardening agents are selected from the group consisting of amines and polyamines.

The hardenable resin composition coated proppant can be prepared in accordance with conventional batch mixing techniques followed by the suspension of the resin coated proppant in the fracturing fluid utilized. Alternatively, the fracturing fluid containing resin coated proppant can be prepared in a substantially continuous manner such as in accordance with the methods disclosed in U.S. Pat. No. 4,829,100 issued on May 9, 1989 to Murphey et al. or U.S. Pat. No. 5,128,390 issued on Jul. 7, 1992 to Murphey et al., both of which are incorporated herein by reference.

After a fracture or fractures are created in the subterranean unconsolidated or poorly consolidated formation extending from the wellbore through the plugged portion of the formation into an unplugged portion thereof and the hardenable resin composition coated proppant has been deposited therein, the hardenable resin composition is caused to harden as described above whereby the proppant is consolidated into a hard permeable mass in the fracture or fractures. The hard permeable mass functions to filter out and prevent the migration of formation sand with fluids produced through the fracture or fractures into the wellbore.

A particularly preferred method of the present invention for stimulating fluid production from an unconsolidated or poorly consolidated permeable hydrocarbon producing formation penetrated by a wellbore while preventing the migration of formation sand with fluids produced therefrom is comprised of the steps of: (a) injecting a liquid composition into a portion of the formation surrounding the wellbore which subsequently converts into a gel-like substance and plugs the permeability of the injected portion of the formation, but allows the injected portion to remain flexible and to resist breakdown due to pressure cycling therein, the liquid composition being comprised of a curable polyepoxide resin, a diluent for the resin, a flexibilizer additive and a delayed resin curing agent; (b) creating at least one fracture in the formation extending from the wellbore through the plugged portion of the formation into an unplugged portion thereof; and (c) depositing hardenable resin composition coated proppant in the fracture and causing the resin composition to harden whereby the proppant is consolidated into a hard permeable mass which filters out and prevents the migration of formation sand with fluids produced through the fracture into the well bore, the hardenable resin composition being comprised of a polyepoxide resin, a diluent for the resin, an aminosilane coupling agent and a hardening agent.

The polyepoxide resin in the liquid composition utilized in step (a) and in the hardenable resin composition utilized in step (c) is preferably comprised of the condensation product of bisphenol A and epichlorohydrin. The diluent in the liquid composition utilized in step (a) and in the hardenable resin composition utilized in step (c) is preferably comprised of butyl lactate, xylene or propanol, and the aminosilane coupling agent in the hardenable resin composition utilized in step (c) is preferably comprised of N-β-(aminoethyl)-δ-aminopropyltrimethoxysilane. The flexibilizer additive in the liquid composition utilized in step (a) is preferably comprised of dibutyl phthalate and the resin curing agent in the liquid composition utilized in step (a) is preferably comprised of polyamides, such as methylene dianiline. The hardening agent in the hardenable resin composition utilized in step (c) is preferably comprised of an amine or polyamine.

Thus, the present invention is well adapted to carry out the objects and attain the ends and advantages mentioned as well as those which are inherent therein. While numerous changes may be made by those skilled in the art, such changes are encompassed in the spirit of this invention as defined by the appended claims.

What is claimed is:

1. A method of stimulating fluid production from an unconsolidated or poorly consolidated permeable producing formation penetrated by a wellbore while preventing the migration of formation sand with fluids produced therefrom comprising the steps of:

(a) injecting a liquid composition into a portion of said formation surrounding said wellbore which subsequently converts into a gel-like substance and plugs the permeability of said injected portion of said formation, but allows said injected portion to remain flexible and to resist breakdown due to pressure cycling therein;

(b) creating at least one fracture in said formation extending from said wellbore through said portion of said formation plugged in accordance with step (a) into an unplugged portion thereof; and (c) depositing hardenable organic resin composition coated proppant in said fracture and causing said resin composition to harden whereby said proppant is consolidated into a hard permeable mass which filters out and prevents the migration of formation sand with fluids produced through said fracture into said wellbore.

2. The method of claim 1 wherein said liquid composition injected in accordance with step (a) is a curable organic resin composition comprised of a curable organic resin, a diluent and a delayed resin curing agent.

3. The method of claim 2 wherein said curable organic resin in said resin composition is selected from the group consisting of polyepoxide resins, polyester resins, urea-aldehyde resins, furan resins and urethane resins.

4. The method of claim 2 wherein said diluent in said resin composition is selected from the group consisting of phenols, formaldehydes, furfuryl alcohol, furfural, esters, alcohols and ethers.

5. The method of claim 2 wherein said delayed resin curing agent in said resin composition is selected from the group consisting of amines, polyamines, amides and polyamides.

6. The method of claim 5 wherein said resin composition further comprises a flexibilizer additive selected from the group consisting of organic esters, oxygenated organic solvents and aromatic solvents.

7. The method of claim 1 wherein said liquid composition injected in accordance with step (a) is a gellable aqueous silicate composition comprised of an aqueous silicate solution and a temperature activated catalyst for gelling said aqueous silicate solution.

8. The method of claim 7 wherein said catalyst in said composition is selected from the group consisting of ammonium sulfate, sodium acid pyrophosphate, citric acid and ethyl acetate.

9. The method of claim 1 wherein said liquid composition injected in accordance with step (a) is a polymerizable organic monomer composition comprised of water, a water soluble polymerizable organic monomer, an oxygen scavenger and a polymerization initiator.

10. The method of claim 9 wherein said water soluble polymerizable organic monomer in said composition is selected from the group consisting of hydroxyethylacrylate, hydroxymethylacrylate, hydroxyethylmethacrylate, N-hydroxymethylacrylamide, N-hydroxymethylmethacrylamide, polyethylene acrylate, polyethylene methacrylate, polyethylene glycol acrylate, polyethylene glycol methacrylate and mixtures thereof.

11. The method of claim 9 wherein said water soluble polymerizable organic monomer in said composition is hydroxyethylacrylate.

12. The method of claim 9 wherein said water soluble polymerizable organic monomer is hydroxyethylcellulose-vinyl phosphoric acid.

13. The method of claim 9 wherein said oxygen scavenger in said composition is comprised of stannous chloride.

14. The method of claim 9 wherein said polymerization initiator in said composition is selected from the group consisting of 2,2'-azobis(2-imidazole-2-hydroxyethyl) propane, 2,2'-azobis(2-aminopropane), 4,4'-azobis(4-cyanovaleric acid) and 2,2'-azobis(2-methyl-N-(2-hydroxyethyl) propionamide.

15. The method of claim 9 wherein said polymerizable organic monomer composition further comprises a cross-linking agent selected from the group consisting of borates, titanium ions, zirconium ions, aluminum ions, antimony ions and metal oxides and a polysaccharide cross-linking delaying agent derived from guar, guar derivatives and cellulose derivatives.

16. The method of claim 1 wherein said fracture is created in accordance with step (b) by pumping a fracturing fluid into said formation at a sufficient rate and pressure to fracture said formation.

17. The method of claim 16 wherein said hardenable resin composition coated proppant is suspended in said fracturing fluid and is deposited in said fracture in accordance with step (c) by said fracturing fluid.

18. The method of claim 1 wherein said proppant is graded sand.

19. The method of claim 1 wherein said hardenable organic resin composition coated on said proppant is comprised of a hardenable organic resin, a diluent and an aminosilane coupling agent.

20. The method of claim 19 wherein said organic resin in said hardenable organic resin composition is selected from the group consisting of novolak resins, polyepoxide resins, polyester resins, phenolaldehyde resins, urea-aldehyde resins, furan resins and urethane resins.

21. The method of claim 19 wherein said diluent in said hardenable organic resin composition is selected from the group consisting of phenols, formaldehydes, furfuryl alcohol, furfural, esters and alcohols.

22. The method of claim 19 wherein said aminosilane coupling agent in said hardenable organic resin composition is selected from the group consisting of N-β-(aminoethyl)-γ-aminopropyltrimethoxysilane, N-β-(aminoethyl)-N-β-(aminoethyl)-γ-aminopropyltrimethoxysilane and N-β-(aminopropyl)-γ-aminopropyltriethoxysilane.

23. The method of claim 19 wherein said hardenable organic resin composition is caused to harden by being heated in said formation.

24. The method of claim 19 wherein said hardenable organic resin composition further comprises a delayed internal hardening agent which causes said resin composition to harden after being deposited in said formation, said delayed internal hardening agent being selected from the group consisting of amines and polyamines.

25. A method of stimulating fluid production from an unconsolidated or poorly consolidated permeable producing formation penetrated by a wellbore while preventing the migration of formation sand with fluids produced therefrom comprising the steps of:

(a) injecting a liquid composition into a portion of said formation surrounding said wellbore which subsequently converts into a gel-like substance and plugs the permeability of said injected portion of said formation, but allows said injected portion to remain flexible and to resist breakdown due to pressure cycling therein, said liquid composition being comprised of a curable polyepoxide resin, a diluent for said resin, a flexibilizer additive and a delayed resin curing agent;

(b) creating at least one fracture in said formation extending from said wellbore through said portion of said formation plugged in accordance with step (a) into an unplugged portion thereof; and (c) depositing hardenable resin composition coated proppant in said fracture and causing said resin composition to harden whereby said proppant is consolidated into a hard permeable mass which filters out and prevents the migration of formation sand with fluids produced through said fracture into said wellbore, said hardenable resin composition being comprised of a polyepoxide resin, a diluent for said resin, an aminosilane coupling agent and a hardening agent.

26. The method of claim 25 wherein said polyepoxide resin in said liquid composition utilized in step (a) and in said hardenable resin composition utilized in step (c) is comprised of the condensation product of epichlorohydrin and bisphenol A.

27. The method of claim 26 wherein said diluent in said liquid composition utilized in step (a) and in said hardenable resin composition utilized in step (c) is comprised of butyl lactate.

28. The method of claim 27 wherein said aminosilane coupling agent in said hardenable resin composition utilized in step (c) is comprised of N-β-(aminoethyl)-δ-aminopropyltrimethoxysilane.

29. The method of claim 28 wherein said flexibilizer additive in said liquid composition utilized in step (a) is comprised of dibutyl phthalate.

30. The method of claim 29 wherein said resin curing agent in said liquid composition utilized in step (a) is comprised of methylene dianiline.

31. The method of claim 30 wherein said hardening agent in said hardenable resin composition utilized in step (c) is comprised of an amine.

* * * * *